United States Patent Office 3,333,921
Patented Aug. 1, 1967

3,333,921
ANHYDROUS AMMONIUM POLYPHOSPHATE PROCESS
Karl O. Knollmueller, Hamden, Conn., assignor to Olin Mathieson Chemical Corporation, New Haven, Conn., a corporation of Virginia
No Drawing. Filed Dec. 6, 1963, Ser. No. 328,458
3 Claims. (Cl. 23—106)

ABSTRACT OF THE DISCLOSURE

Anhydrous ammonium polyphosphates are provided in high yield and purity by heating urea with at least an equimolar amount of an ammonium phosphate at a selected elevated temperature range.

This invention relates to an improved process for preparing ammonium polyphosphates which are useful as water conditioning agents.

It is known that monophosphates can be condensed with elimination of water to provide polyphosphates, and as used in the specification and claims herein, it is understood that the term polyphosphates defines the products formed by the condensation of two or more monophosphate units. More specifically, the ammonium polyphosphates prepared in accordance with the process of this invention can be represented by the following structural formula:

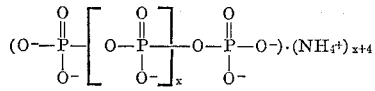

wherein $x$ is an integer as low as 0 and as high as about 60.

Sodium polyphosphates are conventionally prepared by heating selected sodium phosphates at elevated temperatures whereby water is eliminated to yield the desired polyphosphates. However, attempts to prepare ammonium polyphosphates in a similar manner have not been successful since at the elevated temperatures necessary to effect the condensation, ammonia is invariably evolved from the product thereby yielding substantial amounts of polyphosphoric acid. Attempts have also been made to provide anhydrous ammonium polyphosphates by neutralizing polyphosphoric acid with aqueous ammoniacal solutions, but ammonia is again evolved when the water is removed from the system.

Recently, Veda et al. in Kogyo Kagaku Zasshi, 66, 586 (1963) have disclosed that ammonium polyphosphates can be obtained by heating polyphosphoric acid with urea wherein the acid is neutralized with ammonia resulting from urea decomposition. Although anhydrous ammonium polyphosphate is thus obtained, the product is contaminated with large amounts of cyanuric acid, and a tedious purification procedure must be followed in order to obtain ammonium polyphosphate substantially free from this impurity.

The principal object of this invention is to provide an improved process for the preparation of anhydrous ammonium polyphosphate. Another object of this invention is to provide a direct and efficient process for the preparation of anhydrous ammonium polyphosphate of high purity. Still another object of this invention is to provide a novel process particularly suited for the preparation of long chain ammonium polyphosphates.

These objects have been accomplished in accordance with this invention. An efficient process is herein provided for the preparation of anhydrous ammonium polyphosphates. Polyphosphates of high purity are readily obtained as a result of the novel process disclosed herein, and the requirement for purification procedures has been obviated. The novel process involves the heating of urea with ammonium phosphates at a temperature range of about 130° C. to about 200° C. whereby the desired ammonium polyphosphates are directly obtained in high purity. The term "ammonium phosphates," as used herein, is understood to cover ammonium dihydrogenphosphate, diammonium hydrogenphosphate and mixtures thereof. Using the aforementioned process, it has been found that a wide variety of anhydrous ammonium polyphosphates can be readily prepared in high purity.

Although the ammonium polyphosphates can be readily prepared by the process of this invention at temperatures from about 130°–200° C., it has been found that at the upper end of this temperature range the amount of formed impurities such as biuret becomes more significant. Therefore, a process temperature range of about 145°–160° C. is preferentially utilized for best results.

The ammonium polyphosphates can be prepared in the presence of a molar excess of urea, but there are no advantages to be derived from the use of excess urea in the process. Therefore for practical reasons, at least an equimolar amount of ammonium phosphate should be used in the practice of this invention. Polyphosphates of high purity can also be obtained by using excess molar amounts of ammonium phosphate in the process, but it has been found that when more than about 1.2 moles of ammonium phosphate are heated with a molar amount of urea, the product contains a greater amount of short chain polyphosphates such as pyrophosphates, tripolyphosphates, etc. In order to provide longer chain polyphosphates, such as for example those having six and over recurring $(NH_4PO_3)$ units, it is preferred to use ammonium phosphate in an amount of from 1.0 to 1.2 moles per mole of urea present in the reaction mixture.

The formation of the aforementioned longer chain polyphosphates is also accelerated when the process is carried out at a reduced pressure, preferably of about 100 mm. of mercury or less. It appears that the escaping gases cause better agitation and improve heat transfer characteristics of the reaction mixture at reduced pressure. Furthermore, this technique affords a convenient procedure for removing volatiles, chiefly carbon dioxide and ammonia, formed during the process. It is understood however that the use of reduced pressure is not a requisite for the preparation of the longer chain polyphosphates since they can also be provided at atmospheric pressure albeit at a somewhat slower rate.

The following examples will serve to illustrate the preparation of anhydrous ammonium polyphosphates in accordance with the process of this invention.

Example 1

Ammonium dihydrogenphosphate in the amount of 46.0 g. (0.4 mole) was mixed and ground together in a mortar with 24.0 g. (0.4 mole) of urea. The mixture was transferred into a 2-liter resin pot immersed in an oil bath. The bath was electrically heated and was fitted with a thermostat capable of maintaining a preset temperature to ±2° C. The resin pot was connected to a water aspirator via a U-tube filled with $CaCl_2$ and a manometer.

While a pressure of 25 mm. of Hg was maintained in the pot by using the aspirator, the temperature of the mixture was raised to 150° C. When the temperature of the mixture reached the melting temperature of urea, some gassing was observed which increased as the temperature of 150° C. was reached. For approximately one hour the reaction mass had the appearance of a vigorously boiling liquid. Carbon dioxide and ammonia were evolved and removed from the system. As heating continued, the reaction mass became thicker, and the gas bubbles had more difficulty in escaping from the surface. After four hours at 150° C., all movement on the surface of the material had ceased and the mix had solidified.

Heating under vacuum at 150° C. was continued two hours longer, and thus a total reaction time of six hours was achieved. After cooling to room temperature, the reaction mass was easily broken loose. It was powdered under a protective bag since it was slightly hygroscopic. The powdered ammonium polyphosphate thus obtained had a purity of better than 97% as indicated by the following analytical data.

Total nitrogen _____ 15.25%.
Nitrogen (ammonium) __ 14.30%.
Nitrogen (urea) _____ 0.42%=0.9% urea.
Nitrogen by difference ___ 0.53%=(1.3% biuret or cyanuric acid).
Total phosphorus _____ 29.42%.
Atomic ratio of phosphorous to nitrogen (ammonium):
    Theoretical ratio _____ 1:1.00
    Found _____ 1:1.07

Paper chromatography, using the acid solvent system of Ebel, revealed that the product was a higher polymer; that is the number of recurring ($NH_4PO_3$) units was greater than 10.

*Example 2*

This experiment was performed with larger quantities of ammonium dihydrogenphosphate and urea in order to determine whether or not different heat transfer characteristics would affect the result. Thus, 115 g. of ammonium dihydrogenphosphate and 60 g. of urea were treated and reacted in a similar method as employed in Example 1. The end product obtained was identical in all respects to the product obtained in the first example.

*Example 3*

A direct comparison of the effects of pressure on the condensation of ammonium phosphates was obtained in the following manner.

Ammonium dihydrogenphosphate in the amount of 11.5 g. (0.1 mole) was thoroughly mixed in a mortar with 6.0 g. (0.1 mole) of urea. The resultant mix was separated into two portions, each consisting of 8.2 grams.

The first portion was placed in a 250 ml. round bottom flask which was nearly completely immersed in an oil bath. The flask neck was attached to a vacuum line which was connected via a $CaCl_2$ filled tube and manometer to a water aspirator. Then this mixture was subjected to the same treatment as in Example 1, and the identical product was obtained.

The second portion was also placed in a 250 ml. round bottom flask which was nearly completely immersed in an oil bath. A double holed rubber stopper was inserted in the flask neck, and a gas inlet tube was inserted through the stopper with its end above the surface of the mixture in the flask. A gas outlet tube also was inserted through the stopper and attached to a $CaCl_2$ tube. The inlet tube was connected to a $CaCl_2$ filled drying tower via a flowmeter. Then dry air was passed over the reaction mixture throughout the experiment at the rate of 20 ml./minute. The oil bath was heated to 148° C. for a period of seven hours. The reaction mixture did become moist at 132° C. and above, but in contrast to the examples performed in vacuo, a clear melt was never obtained but rather a moist material with no fluid properties was obtained. This atmospheric condensation did evolve $CO_2$ which was easily shown by passing evolved gas into barium hydroxide solution wherein barim carbonate precipitated.

Samples of the reaction mixture were taken after 36 minutes and after two hours, and they were analyzed by paper chromatography. After 36 minutes, only traces of monophosphate were found, and at this point the product was chiefly pyrophosphate containing a small amount of tripolyphosphate. After two hours, none of the monophosphate was present. The main product was still pyrophosphate, but an increased amount of tripolyphosphate had been found, and traces of tetrapolyphosphate and higher condensed polyphosphates were present. After seven hours, the resulting hard mass was cooled to room temperature, ground and stored in a dry container. Paper chromatography analysis revealed that a whole line of products, ranging from the pyrophosphate to polyphosphates containing over ten recurring ($NH_4PO_3$) units, were found in the product. This material also contained a slightly greater amount of urea and insoluble urea condensation products than the material prepared in vacuo.

*Example 4*

Diammonium hydrogenphosphate in the amount of 13.2 g. (0.1 mole) was mixed and ground together in a mortar with 6.0 g. (0.1 mole) of urea. The mixture was placed in a 500 ml. round bottom flask immersed in an oil bath. A vacuum line was attached to the flask neck and connected to a water aspirator via a $CaCl_2$ tube and a manometer. The oil bath was heated to 148° C. while a pressure of 25 mm. Hg was maintained. The reaction mixture began to melt at 132° C., and a vigorous gassing set in at 145° C. The mixture looked like a boiling liquid, and gassing continued for about 2½ hours before the mass became less mobile. After four hours, the reaction mixture was a solid. After heating at 148° C. for a total of six hours, the reaction mass was cooled to room temperature, ground under a protective bag and stored in a dry flask. Paper chromotograph analysis revealed that the product was chiefly polymeric ($NH_4PO_3$)$_x$ wherein $x>10$. No monophosphate was present, and only traces of di- and tripolyphosphate were found in the product. The following analytical data was obtained on the product.

Total nitrogen _____percent__ 15.22
Nitrogen (ammonium) _____do____ 14.42
Nitrogen (urea) _____do____ 0.7
Total phosphorus _____do____ 31.35
Atomic ratio of phosphorus to nitrogen (ammonium):
    Theoretical _____ 1:1.00
    Found _____ 1:1.02

What is claimed is:

1. A process for preparing anhydrous ammonium polyphosphate having an average chain length of at least six recurring —($NH_4PO_3$)— units which comprises providing a mixture of urea and ammonium phosphate, said phosphate being utilized in an amount of from 1.0 to 1.2 moles per mole of urea in said mixture, heating said mixture at a temperature of about 130°–200° C. under reduced pressure, removing evolved gases from the reaction mixture and recovering the solid polyphosphate product.

2. The process of claim 1 wherein a temperature of about 145°–160° C. is utilized.

3. The process of claim 1 wherein said pressure is less than about 100 mm. of mercury.

References Cited

UNITED STATES PATENTS 2,781,281   2/1957   Berger _____ 117—136

FOREIGN PATENTS 321,212   6/1957   Switzerland.

OSCAR R. VERTIZ, *Primary Examiner.*

O. F. CRUTCHFIELD, B. H. LEVENSON,
                        *Assistant Examiners.*